March 18, 1941.　　　　　J. H. McKEE　　　　　2,235,032
METHOD OF MAKING AIRCRAFT PROPELLER BLADES
Filed June 5, 1937　　　　7 Sheets-Sheet 1

INVENTOR
James H. McKee
By Green & McCallister
His Attorneys

March 18, 1941. J. H. McKEE 2,235,032
METHOD OF MAKING AIRCRAFT PROPELLER BLADES
Filed June 5, 1937 7 Sheets-Sheet 3

INVENTOR
James H. McKee
By
Green & McCallister
His Attorneys

INVENTOR
James H. McKee
By Green & McCallister
His Attorneys

March 18, 1941.   J. H. McKEE   2,235,032
METHOD OF MAKING AIRCRAFT PROPELLER BLADES
Filed June 5, 1937   7 Sheets-Sheet 6

INVENTOR
James H. McKee
By Green & McCallister
His Attorneys

INVENTOR
James H. McKee
By Green & McCallister
His Attorneys

Patented Mar. 18, 1941

2,235,032

UNITED STATES PATENT OFFICE 2,235,032

METHOD OF MAKING AIRCRAFT PROPELLER BLADES

James H. McKee, Pittsburgh, Pa., assignor, by mesne assignments, to Curtiss-Wright Corporation, New York, N. Y., a corporation of Delaware Application June 5, 1937, Serial No. 146,644

10 Claims. (Cl. 29—156.8)

This invention relates to hollow metal blades for aircraft propellers, to camber member blanks for use in the manufacture of such blades and to the making of such camber member blanks and blades.

In applications heretofore filed by me and serially numbered 74,007, filed April 13, 1936, and 84,698, filed June 11, 1936, I have disclosed improved blades of the type disclosed in T. A. Dicks Patent No. 1,713,500 of May 14, 1929. These and the blade of the Dicks patent comprise two camber members bonded together by an inlaid metal weld which lies wholly within the thrust or pressure face of the blade. In these blades the blade shank is formed in one piece with the hollow outer camber member. In my application Ser. No. 74,007 in addition to blades of the Dicks type, I disclose a form of blade which is bonded together along its leading and trailing edges and in such blades each camber member blank includes one half of the shank forming portion of the blade.

In all of the forms of blade disclosed in said applications, the camber members are longitudinally tapered in thickness from the shank forming portion thereof to the tip end and in all forms, these camber members at all transverse sections thereof are materially thicker at their edges than at their centers. In one form the increase in thickness at all transverse sections is gradual from the center to the edges thereof. In another form, the camber members at all transverse sections of the blade proper are of uniform thickness throughout the major portion of the width thereof and are provided with bounding edge portions which are materially thicker than the portion they bound and which merge with such portion on more or less gradual slopes.

The camber members of the blade disclosed in the Dicks patent and those disclosed in my said applications are formed from hot rolled metal (preferably steel) plates. It is well known that metal plate-like material especially steel plate produced by rolling is not always homogeneous throughout. It is frequently found that the central portion of such plate, that is the portion lying substantially midway between the sides thereof is of weaker structure than the surface portions and the portions lying immediately adjacent thereto. This condition starts in the ingot and persists throughout all the rolling stages from ingot to plate.

When a camber member such as disclosed in my said applications is made from a plate which is longitudinally tapered in thickness by a machining operation and is then further machined to reduce its thickness between the portions thereof which are to form the side edges of the camber member, it will be apparent that a material part of the best portions of such plate have been removed and an object of this invention is to provide a method of contouring such camber member blanks by rolling operations.

Another object of this invention is to provide a method in which the entire contouring of a plate to produce a camber member blank which at all transverse sections thereof throughout the blade forming portion is materially thicker at its edges than at its longitudinal center is accomplished by rolling operations.

A further object of this invention is to produce a hollow metal aircraft propeller blade from die rolled camber members.

In making a camber member blank in accordance with this invention, I start with a blank cut from hot rolled plate-like material and therefore obtain all the advantages heretofore obtained by the use of such material in the manufacture of camber members for the blade of the Dicks patent and those of my said applications.

The blanks are heated to rolling temperature and longitudinally tapered in thickness throughout the major part of their length. The tapered blanks are preferably trimmed to a more or less blade-like form and the trimming is preferably done immediately after the tapering operation is finished and while the blank is still hot.

The trimmed blank is then reheated to rolling temperature and die rolled to substantially finished dimensions so far as the thickness of the major portions thereof are concerned. The die rolling operation reduces the thickness of the blank and elongates the same and the die roll pass is of such character that the blank as it emerges therefrom is flat on one side and on the other is provided with upstanding ridges which join at the tip end of the blade and which together define the outline of a rudimentary camber member. The ridges in the main decrease in height from the shank end of the blank to the tip end thereof.

The inner slope of the ridges gradually merges with the body portion of the blank surrounded by the ridges, while the outer slope merges with the flash or overfill which surrounds the blade.

The first pass or that pass in which the heated plate-like blank is longitudinally tapered in thickness is preferably formed between two rolls one of which is cylindrical and the other of which in the main is eccentric.

In making camber members for either type of blade disclosed herein, I preferably start as I have said, with an elongated rectangular blank sheared from hot rolled plate-like material of the proper thickness.

Figures 1, 2:
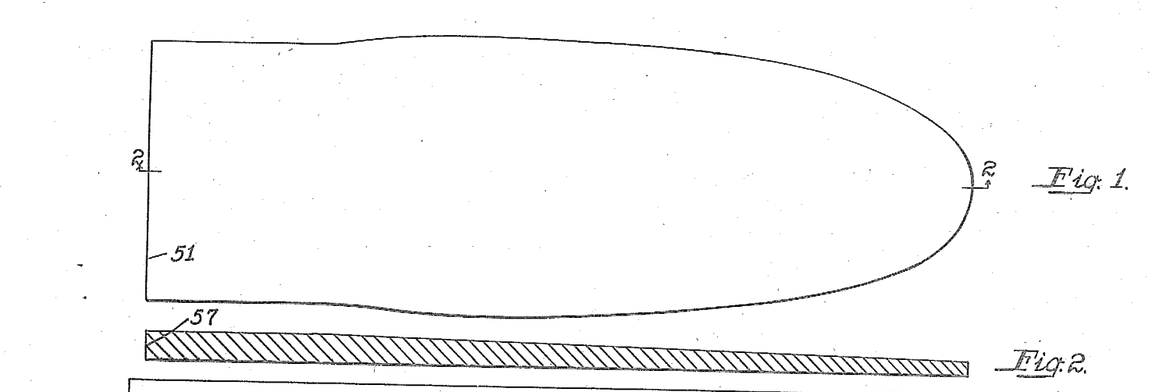
Figure 1 is a plan view of the hot rolled plate-like metal blank after the same has been longitudinally tapered throughout the major part of its length and has been trimmed to a more or less blade-like form.
Fig. 2 is a longitudinal section of such blank taken on line 1—1 of Fig. 1.

This blank is raised to rolling temperature and then by a hot rolling procedure, is longitudinally tapered in thickness throughout the major part of its length. It is preferably reduced in thickness throughout its entire length but only tapered from the shank forming portion thereof to its tip or opposite end. After the blank has been subjected to the tapering step and preferably while still hot, it is trimmed to a more or less blade-like shape as shown in Fig. 1 for the purpose of facilitating the die rolling operation.

Figure 32:
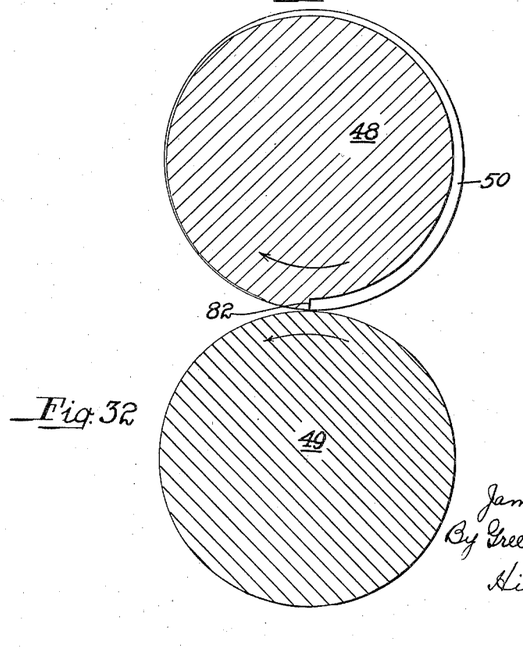
Fig. 32 is a diagrammatic illustration of the rolls of a rolling mill for carrying out the die rolling operation.
Figure 33:
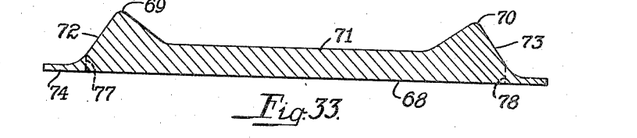
Figs. 33, 34, 35, 36 and 37 are transverse sections of a die rolled camber member blank (before the same is trimmed) for this modified type of blade. These sections are taken at stations corresponding to sections 27-31 inclusive of the matrix of Fig. 26.
Figure 34:
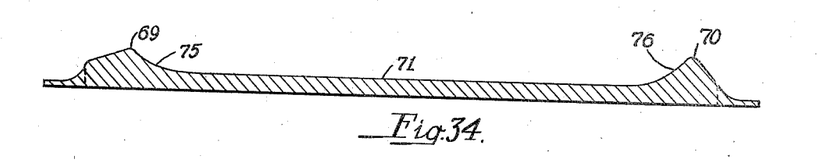
Figure 35:
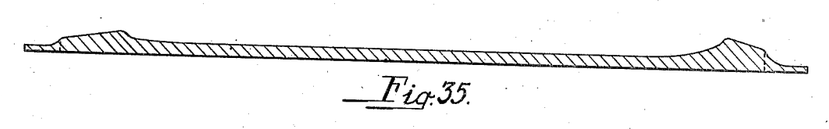
Figure 36:
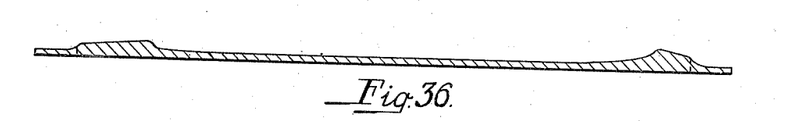
Figure 37:
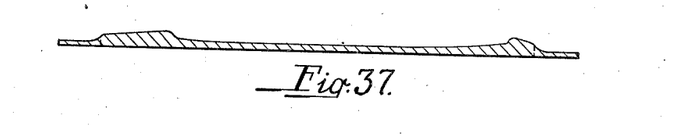
Figures 38, 39, 40:
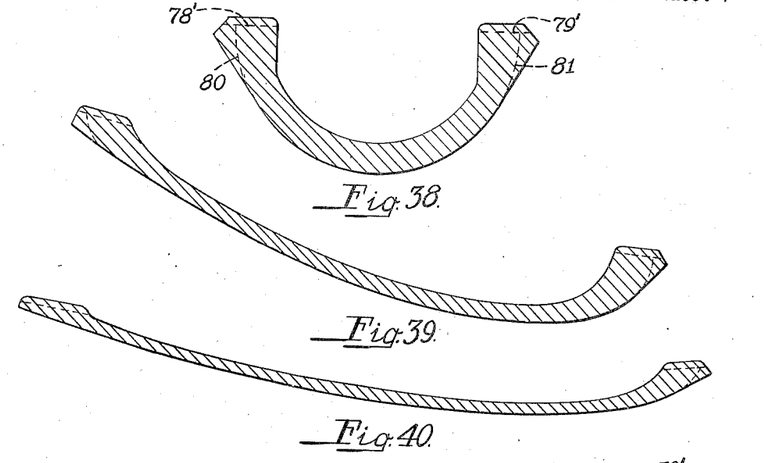
Figs. 38, 39, 40, 41 and 42 illustrate the transverse sections 33-37 inclusive after the flash or overfill has been removed and after the trimmed blank has been die pressed to outer camber member form. These views illustrate the die pressed blank before the edges of the same have been profiled.
Figure 41:
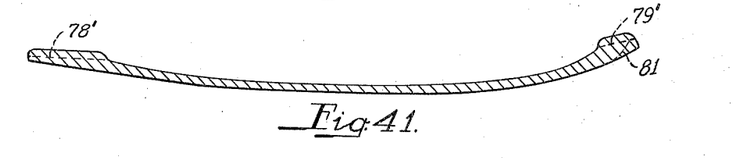
Figure 42:
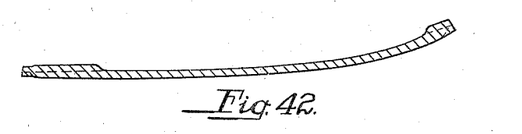

After the tapering and trimming operation, the blank is reheated to rolling temperature and is then die rolled in a mill such as is diagrammatically illustrated in Fig. 32 having a matrix roll 48 and a plain cylindrical roll 49.

Due to the fact that hot rolled plate stock is used as starting material, the camber member blanks are die rolled singly and not in multiple lengths as is done in most of the prior die rolling procedures.

In making an outer camber member for the blade of this application which is of the Dicks type, the matrix in roll 48 will be that disclosed in Figs. 3 to 8 of the drawings and when making camber members for the other blade the matrix in roll 48 will be that disclosed in Figs. 26 to 31 inclusive.

I have not disclosed the matrix for die rolling the inner camber member of the Dicks type blade of this application. The design of the matrix for producing the inner camber member will be understood from an inspection of the untrimmed transverse sections of such member illustrated in Figs. 15, 16, 17 and 18. These are typical sections of the untrimmed die rolled blank at stations 19, 20, 21, 22 and 23 of the blade of Fig. 3.

No matter which type of blade is to be produced, the matrices for die rolling the camber members for such blades will have to be varied to produce just the contour desired in the particular blade.

The rolls are driven by a motor through a reduction gearing and pinion stand and the motor must be capable of starting under load.

and the other side which is contoured by the matrix is provided with two upstanding ridges 69 and 70 which extend throughout the length of the blank adjacent the side edges thereof and merge at the tip end.

The body of the blank or that portion 71 lying between ridges 69 and 70 is of uniform section throughout the shank forming portion and from such portion is longitudinally tapered in thickness to the tip end.

Outer slopes 72 and 73 of ridges 69 and 70 respectively merge with the flash or overfill which is formed during the die rolling operation as will be readily understood. The inner slope 75 of ridge 69 as well as inner slope 76 of ridge 70 merge with the body 71. The height of both ridges 69 and 70 decreases from the shank end to the tip end of the blank. After the blanks have been die rolled, they are descaled either by pickling or sand blasting or by a combination of these two procedures and the excess metal is then trimmed therefrom. This excess metal includes the flash or overfill and a portion of outer slopes 72 and 73. The point at which the blank is trimmed is denoted by dotted line 77 cutting the base of outer slope 72 and dotted line 78 cutting the base of outer slope 73.

The trimmed blanks are then die pressed while in the cold state one to the contour of the hollow outer camber member and the other to the contour of the hollow inner camber member. Figures 38 to 42 inclusive illustrate transverse sections of the outer camber member blank after the same has been die pressed. It will be seen that the top of ridges 69 and 70 which join at the tip end of the camber member form the inner edge of the hollow camber member structure.

The outer slopes 72 and 73 which have now become the top edges of the camber member are next profiled to dotted lines 78' and 79' by a suitable profiling machine. The female portion of the die in which the die pressing operation is performed may if desired be utilized as a jig or support for holding the camber member during the profiling operation.

The edges of the outer and inner camber members are so profiled that when the camber members are placed together in the position they are to occupy in the finished blade, such edges contact throughout the entire length of the camber members.

In order to bond these camber members together into a rigid hollow blade structure, I preferably clamp the members together with a thin sheet of copper interposed between the edges of the camber members. The clamped structure, which includes the camber members, the intervening bond metal is then placed in a furnace in which a hydrogen or other reducing atmosphere is maintained and is raised to a temperature at which the camber members are bonded together throughout the entire area of their adjacent edge portions. The bonded structure and its clamping device are then removed from the furnace and allowed to cool slowly. After this the blade is removed from the clamping device and is then ready for further heat treatment and finishing and balancing operations.

Figure 43:
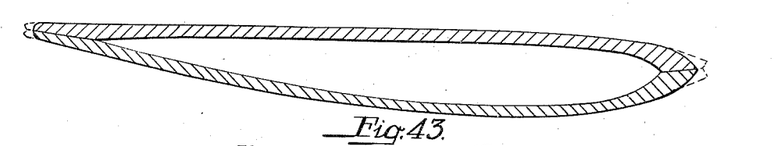
Fig. 43 is a typical transverse section of a partially finished blade made from a pair of camber members embodying this invention, and corresponds in part to a section taken at station 43—43 of Fig. 44, Fig. 44 being a view of a finished blade embodying this invention. The major part of the blade is shown in plan with a portion of the shank shown in section. The camber member sections 38-42 inclusive, although not profiled, are sections of the partially finished blade at stations corresponding to sections 38—38, 39—39, 40—40, 41—41 and 42—42 of Fig. 44.
Figure 44:
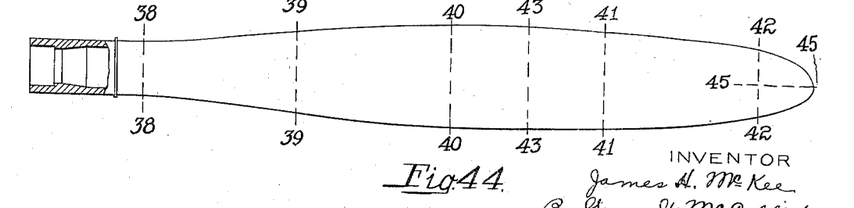
Figure 45:
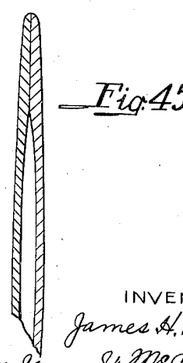
Fig. 45 is a longitudinal section of the tip of the blade of Fig. 44 and is taken on line 45—45 of such figure.
Figure 46:
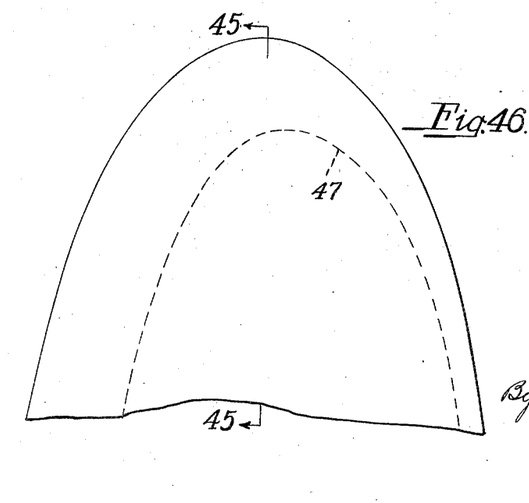
Fig. 46 is a plan view of such tip and the dotted line indicates the inner edges of the profiled ridge at the tip.

Fig. 43 is a transverse section of the finished blade of Fig. 44 and as before said, is taken on line 43 of such figure. The dotted lines beyond the leading and trailing edges of the blade denote portions of the bonded structure that are removed during the finishing operations. Dotted lines 80 and 81 of Figs. 38 to 42 inclusive denote surfaces of the outer camber member of the finished blade at the trailing and leading edges respectively.

In contouring the plates to form camber member blanks in accordance with this invention, no part of either surface of the plate is removed. Its section is merely changed to obtain the desired contour and the central portion of the plate remains the central portion of the camber member blank, and if the plate happens to have a weaker or less favorable interior structure, no part of this ever becomes any part of the surface of the camber member blanks. As a matter of fact both the die rolling operation and the tapering operation are grain refining operations and tend to improve the entire structure.

Figures 25, 26:
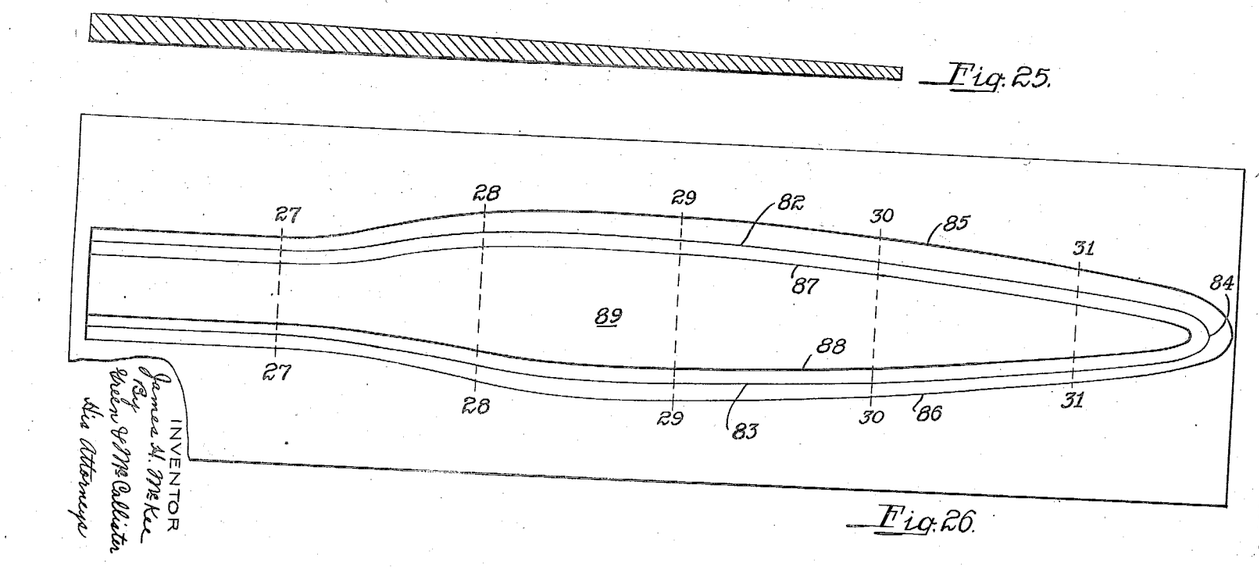
Fig. 25 is a transverse section of such blank and is taken on line 25—25 of Fig. 24.
Fig. 26 is a development of the matrix roll utilized in both camber members for this type of blade. The blanks for both camber members for this type of blade are the same and the minor differences in dimensions and contour are obtained by processing steps that are subsequent to the die rolling step.
Figure 27:
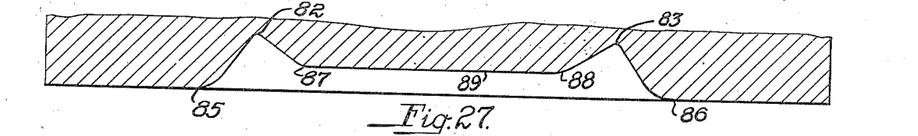
Figs. 27, 28, 29, 30 and 31 are transverse sections of the matrix portion of the roll and are taken at lines 27—27, 28—28, 29—29, 30—30 and 31—31 respectively of Fig. 26.
Figure 28:
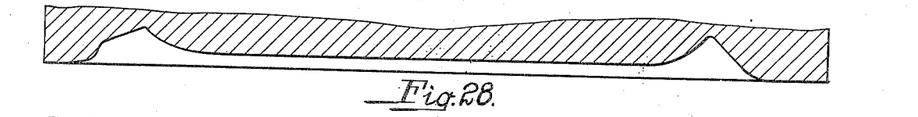
Figure 29:
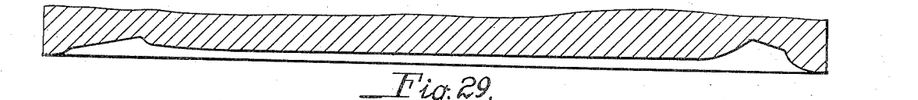
Figure 30:
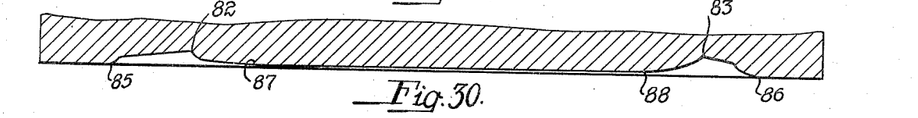
Figure 31:
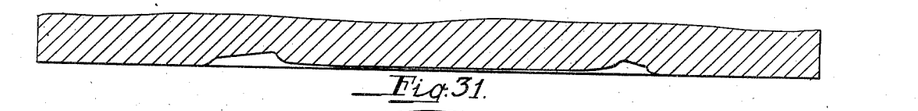

In Fig. 26, lines 82 and 83 which join at the tip end at 84 denote the bottom of the matrix groove. Lines 85 and 86 which also join at the tip end of the matrix denote the junction between the matrix and the cylindrical surfaces of the roll on each side thereof. Lines 87 and 88 which also join at the tip end of the matrix denote the junction of the side grooves of the matrix with the central depressed portion 89.

It will be understood that the different matrices necessary for die rolling different camber members for hollow metal blades for aircraft propellers will necessarily vary in accordance with the particular camber members desired.

Instead of camber members which at all transverse sections throughout the blade forming portion thereof are of uniform thickness except at the thickened edge portion as shown in the drawings, camber members may be die rolled in which the thickness at all transverse sections of the blade forming portion thereof gradually increases from the longitudinal center line or a line closely adjacent thereto to the outer edges. When die rolling such camber members, I also start with plate-like material and taper the same longitudinally throughout the major portion of their length by a hot rolling operation. The tapered blank is then trimmed to a more or less blade-like form and then heated and die rolled to obtain the gradual increase in thickness referred to.

Having thus described my invention, what I claim as new and desire to secure by Letters Patent is:

1. A method of making a camber member for a hollow metal aircraft propeller blade, which comprises forming a plate-like blank, heating said blank to rolling temperature, longitudinally tapering said blank in thickness throughout the major part of its length, trimming said tapered blank to a rudimentary blade form, reheating such trimmed blank to rolling temperature, entering the shank end of such heated blank in a die rolling pass and die rolling the same in a single pass to produce a blank which on one side is flat and on the other is provided with a ridge which in the main decreases in height from its shank end to its tip end and which defines the outline of a rudimentary camber member, trimming said blank along said ridge and die pressing the same into a hollow camber member having one open side with the inner edge thereof formed by the remaining part of said ridge.

2. A method of making a camber member for a hollow metal aircraft propeller blade, which comprises forming a plate-like blank, heating said blank to rolling temperature, longitudinally tapering said blank in thickness throughout the major portion of its length, reheating such blank to rolling temperature, entering the shank end of When the mill is equipped with the proper matrix roll for producing the particular camber member desired and the rolls are properly set and adjusted so that the deep end of the matrix is at the meeting line of the rolls as shown in Fig. 32, the thick end of the heated blank is forced against the rolls at the entrance of the pass and the rolls are given one complete revolution; rotation taking place in the direction of the arrows.

Figure 3:
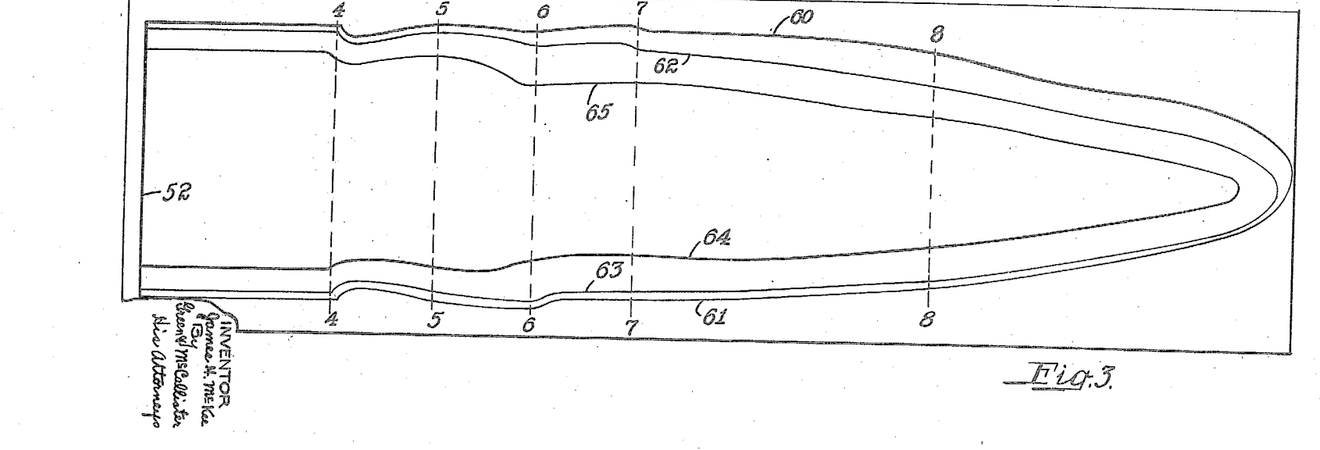
Fig. 3 is a development of the matrix roll for the roll pass utilized in die rolling outer camber member blanks for blades of the Dicks type and embodying the improvement of my said application.
Figure 4:
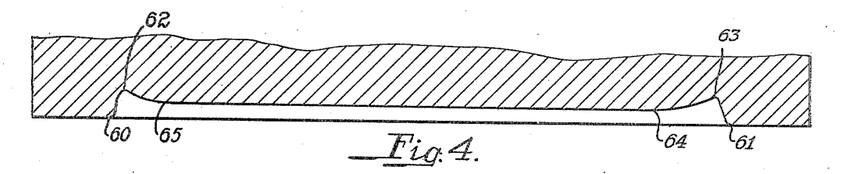
Figs. 4, 5, 6, 7 and 8 are transverse sections of the matrix portion of the roll of Fig. 3 and such sections are taken on lines 4—4, 5—5, 6—6, 7—7, and 8—8 respectively of Fig. 3.
Figure 5:
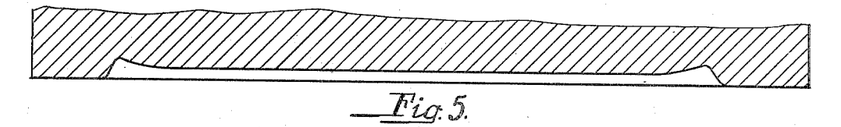
Figure 6:
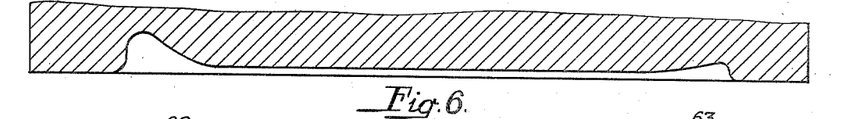
Figure 7:
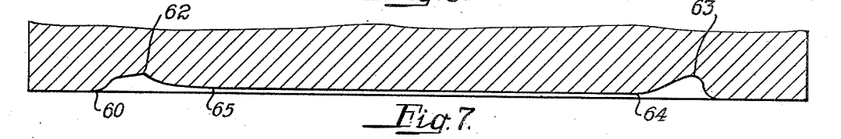
Figure 8:
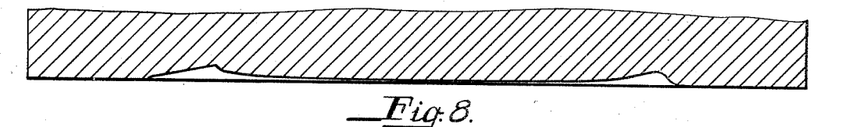

When the blank emerges from the pass it is smooth and flat on one side—the side in contact with roll 49—and on the other side is provided with a contour produced by the matrix of Fig. 3. The contoured side has upstanding ridges 53 and 54 which extend from end to end of the blank adjacent its longitudinal edge and join at the tip end.

The body portion of the blank or portion 55 located between ridges 53 and 54 is of uniform thickness at all transverse sections from the shank forming portion of the blank to its tip end and is of decreasing thickness from the shank portion to the tip end. The inner sides of the ridges merge with the body portion on gradual slopes as shown in Figs. 10, 11, 12, 13 and 14.

Figures 12, 16, 21:
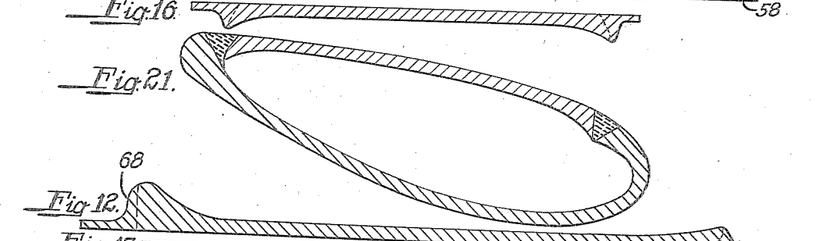
Figures 13, 17, 18, 22:
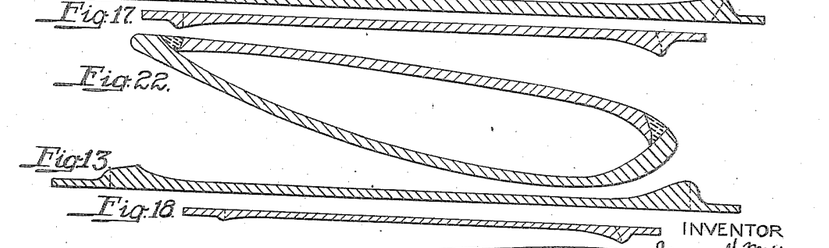
Figure 14:
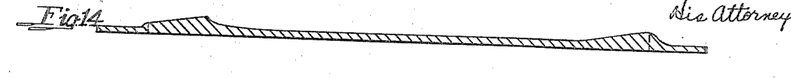
Figure 23:
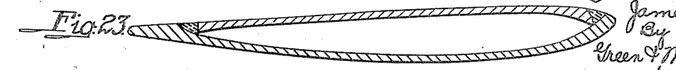

Ridges 53 and 54 in the main decrease in height from the shank end to the tip end, there is, however, a departure from this at certain positions as shown for instance in Figs. 12 and 13. The ridges at all stations are of such height and contour as to give to the finished camber member just the distribution of metal desired at all stations; the object being to provide a contour such that the unit stresses in the high stress areas of the blade are maintained as low as possible; the weld bond areas are maintained as large as possible and the amount of weld metal required to join the two camber members together reduced to a minimum.

The outer sides 56 and 57 of ridges 53 and 54 merge into the overfill or flash 58 which surrounds the blank proper. Lines 60 and 61 (Fig. 3) denote the side boundaries of the matrix; lines 62 and 63 the bottom of the matrix grooves or those portions which form the tops of ridges 53 and 54, while lines 64 and 65 denote the place at which the side grooves join the central part of the matrix or that portion which forms the surface of the central or body portion of the blank.

After the camber member blank is die rolled, and preferably before it has been trimmed, all scale is removed therefrom, either by a pickling procedure or by sand blasting or by a combination of these two depending upon the tightness of the scale and the difficulty encountered in removing the same.

After all scale is removed, the camber member blank is trimmed, as indicated by the dotted lines in Figs. 10 to 14, inclusive.

The inner camber member blank, transverse sections of which are taken at stations 20—20, 21—21, 22—22, 23—23 is illustrated in Figs. 15 to 18, inclusive. This blank is produced in the same manner as the outer camber member blank but by means of a matrix designed for that purpose. The inner camber member blank however is longitudinally tapered from end to end, since the blade shank is formed entirely from the shank forming portion of the outer camber member blank.

The inner camber member blanks after being die rolled and descaled are trimmed as shown by dotted lines in Figs. 15, 16, 17 and 18.

Figure 9:
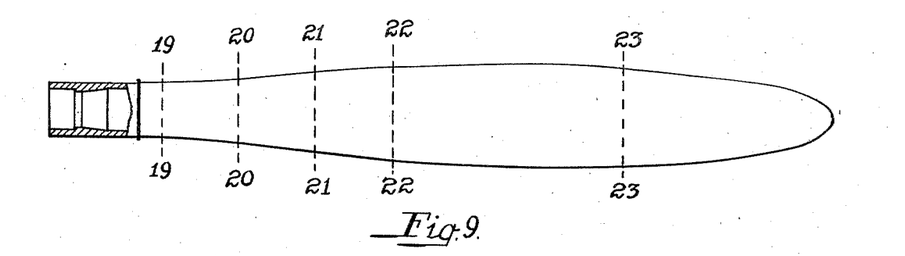
Fig. 9 is a plan view of a blade constructed from camber members processed in accordance with this invention.
Figures 10, 11, 15, 19, 20:
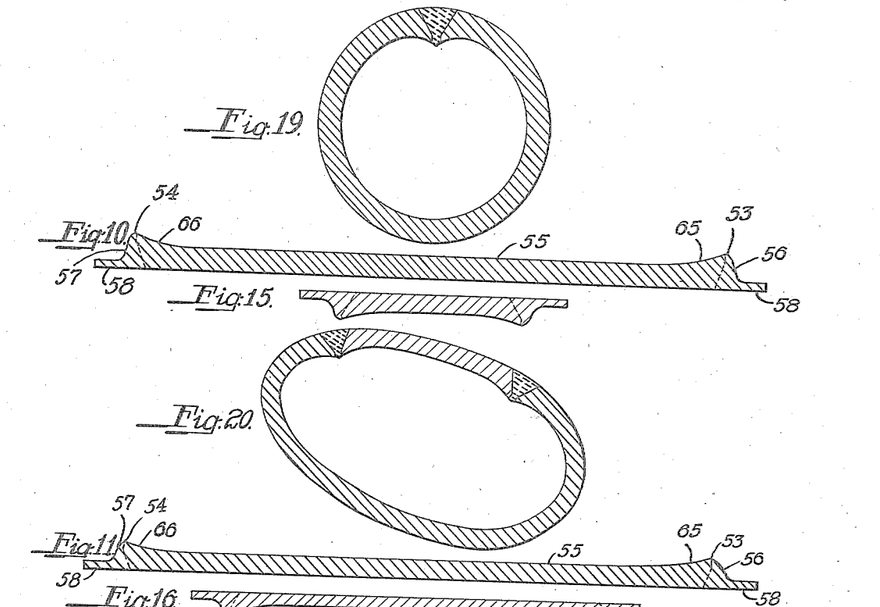
Figs. 10, 11, 12, 13 and 14 are transverse sections of the blank corresponding to sections 4, 5, 6, 7 and 8, respectively of Fig. 3. These views are taken before the blank is trimmed to rudimentary camber member form.
Figs. 15, 16, 17 and 18 are transverse sections of the die rolled inner camber member blank at stations corresponding to the stations at which the outer camber member blanks are taken.
Figs. 19, 20, 21, 22 and 23 are transverse sections of a finished blade of the Dicks type constructed from camber members embodying and made in accordance with this invention. In these Figures 19–23 inclusive, the camber member blanks have been trimmed and die pressed to form and are shown bonded together by inlaid weld metal which is located wholly within the pressure or thrust face of the blade. Sections 19–23 inclusive are taken on lines 19—19, 20—20, 21—21, 22—22, and 23—23 respectively of Fig. 9.

The trimmed camber member blanks are die pressed cold to the desired form and the shank portion of the outer camber member blank is rolled or forged or otherwise formed into tubular form as shown in Figs. 9 and 19.

The die pressing operation converts the outer camber member blank into a hollow outer camber member having the contour and pitch desired in the finished blade and having one side open.

The inner camber member blank is also die pressed so that when placed in the position it is to occupy in the finished blade it, together with the surrounding weld metal, completes the pressure or thrust face of the blade.

In forming the blade structure from the two camber members, the outer camber member is placed in position within a support with the open side uppermost. The inner camber member is then supported in place where it occupies a position within the opening in the open side of the outer camber member and equally spaced from the inner edge of said member. This is accomplished by supporting the inner camber member on a collapsible mandrel located within the outer camber member and which is capable of being withdrawn through the hollow shank after the welding operation is completed. The two camber members are then heated to a temperature which will facilitate the welding operation. Weld metal is then deposited in the V-shaped space which extends longitudinally of the shank and in the V-shaped space between the adjacent edges of the two camber members. After the welding operation is completed the mandrel is withdrawn and the welded structure is heat treated to remove all strains. Excess weld metal protruding beyond the normal face of the blade structure is then removed and the blade is subjected to the final finishing operations and then balanced.

Figure 24:
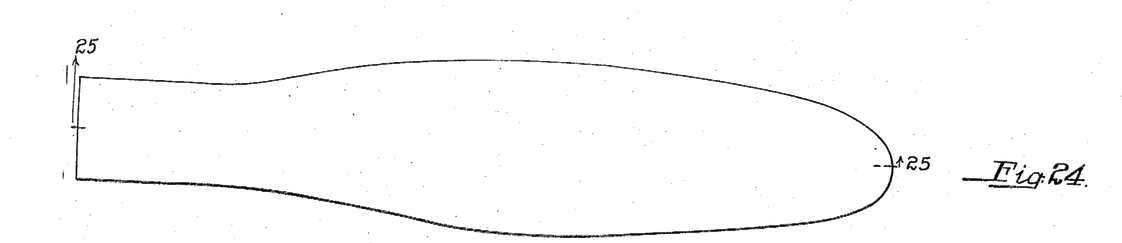
Fig. 24 is a plan view of a hot rolled metal blank for a blade of the type in which the fused metal for bonding the camber members together is located within the leading and trailing edges of the blade. This figure shows the hot rolled blank after being tapered and trimmed to more or less blade-like form for use as a starting piece in the die rolling step.

In making the modified form of blade disclosed in plan in Fig. 44 and in transverse section in Fig. 43, I start with two identical elongated rectangular blanks sheared from hot rolled metal plate-like stock. These blanks are raised to rolling temperature and longitudinally tapered in thickness throughout that portion which forms the blade proper. The blanks are then trimmed to a more or less blade-like form as shown in Fig. 24. Fig. 25 discloses the longitudinal taper referred to and this figure shows the shank forming portion of the blank of uniform section.

The trimmed blanks are then reheated to rolling temperature and each is die rolled. In this case, the matrix of roll 48 is the matrix disclosed in Fig. 26.

In this modified form, both camber member blanks are identical. The slight differences in the camber members of the finished blade are obtained in the pressing operation to which the trimmed camber member blanks are subjected.

The camber member blanks are separately die rolled and the die rolling operation of each is performed in the manner described in connection with the die rolling of the outer camber member blank for the blade of the Dicks type.

The matrix roll (Fig. 26) is so designed that when used in connection with cylindrical roll 49 in die rolling a camber member blank, a blank is produced such as disclosed in Figs. 33 to 37 inclusive. Figs. 27 to 31 inclusive represent transverse sections of the matrix roll of Fig. 26 and are taken on lines 27—27, 28—28, 29—29, 30—30 and 31—31 of such figure. One side 68 of each of the camber member blanks is flat and smooth—the side rolled in contact with roll 49— said heated blank in a die rolling pass and die rolling the same in a single pass to produce a blank which on one side is flat and on the other is provided with a ridge which in the main decreases its height from its shank end to its tip end and which defines the outline of a rudimentary camber member, trimming said blank along said ridge and die pressing the same into a hollow camber member having one open side with the inner edge thereof formed by the remaining part of said ridge.

3. A method of making a camber member for a hollow metal aircraft propeller blade, which comprises forming a plate-like blank, heating said blank to rolling temperature, longitudinally tapering said blank in thickness throughout the major part of its length, trimming said tapered blank to a rudimentary blade form, reheating such trimmed blank to rolling temperature, entering the shank end of said heated blank in a die rolling pass and die rolling the same to produce a blank which on one side is flat and on the other is provided with a ridge which defines the outline of a rudimentary camber member, trimming said blank along said ridge and die pressing the same into a hollow camber member having one open side with the inner edge thereof formed by the remaining part of said ridge.

4. A method of making a camber member for a hollow metal aircraft propeller blade, which comprises forming a plate-like blank, heating said blank to rolling temperature, longitudinally tapering said blank in thickness throughout the major portion of its length, reheating such blank to rolling temperature, entering the shank end of said heated blank in a die rolling pass and die rolling the same to produce a blank which on one side is flat and on the other is provided with a ridge which defines the outline of a rudimentary camber member, trimming said blank along said ridge and die pressing the same into a hollow camber member having one open side with the inner edge thereof formed by the remaining part of said ridge.

5. A method of making a camber member for a hollow metal aircraft propeller, which comprises forming by hot rolling a blank which is longitudinally tapered in thickness throughout the major part of its length, passing such tapered blank with its thick end foremost through a die rolling pass to produce on one side thereof an upstanding ridge which in the main decreases in height from the shank end of the blank to its opposite end and which outlines a rudimentary camber member, severing from such blank such rudimentary camber member and die pressing such member into a hollow camber member structure heaving one open side and in which the remaining part of said ridge forms the inner edge of said side.

6. A method of making a camber member for a hollow metal blade for aircraft propellers, which comprises heating a plate-like metal blank to rolling temperature and longitudinally tapering the same in thickness throughout the major part of its length, trimming such tapered blank to a rudimentary blade form, reheating the trimmed blank, entering the thick end of the reheated blank in a die rolling pass and die rolling the same to produce a blank which on one side is flat and on the other is provided with a ridge-like portion which defines the outline of a rudimentary camber member, severing from such blank such rudimentary camber member and die pressing the same into a hollow camber member structure having one open side with the remaining part of said ridge forming its inner edge.

7. A method of making a camber member blank for a hollow metal blade for aircraft propellers which comprises heating a metal starting piece to rolling temperature and rolling the same into a blank which tapers longitudinally in thickness throughout the major part of its length, reheating said blank, entering the thick end thereof in a die rolling pass and die rolling the same to produce a blank which is flat on one side and on the other is provided with a ridge-like portion defining the outline of a rudimentary camber member, severing from such blank such rudimentary camber member and die pressing the same into a hollow camber member structure having one open side with the remaining part of said ridge forming the bounding edge of said open side.

8. A method of making a camber member blank for a hollow metal blade for aircraft propellers, which includes heating a metal starting piece to rolling temperature and rolling the same into a blank which tapers longitudinally in thickness throughout the major part of its length, entering the thick end of said blank in a die rolling pass and die rolling the same to produce a blank which is substantially flat on one side and on the other is provided with a portion having the outline of a rudimentary camber member and which is materially thicker at the edges of such portion than at its longitudinal center, severing from such blank such rudimentary camber member and die pressing the same into a camber member blank.

9. In a method of making a camber member blank for a hollow metal aircraft propeller blade, the steps which include entering in a die rolling pass the thick end of a longitudinally tapered metal blank raised to rolling temperature, die rolling such blank to produce a blank which on one side is substantially flat and on the other is provided with a ridge which in the main decreases in height from one end of said blank to the other and which defines the outline of a rudimentary camber member, trimming said blank along said ridge and pressing the trimmed blank into a hollow member having one open side with the inner edge thereof formed by a portion at least of said ridge.

10. In a method of making a camber member blank for a hollow metal propeller blade for aircraft, the steps which include entering a rectilinear flat blank having longitudinal grain flow in a rolling pass and in die rolling said blank longitudinally to produce a longitudinal taper in thickness therein, trimming the tapered blank to approximate blade profile, entering in another die rolling pass one end of the tapered blank, in die rolling said blank to produce on one side thereof ridges substantially at the periphery of the blank which decrease in height from the thick end of the blank toward the thin end and to produce a zone between said ridges of less thickness than the tapered blank but tapered longitudinally in correspondence thereto, and trimming from the edges of said ridges the flash or overfill and a portion of the ridge material, said second rolling pass serving to re-orient the grain structure of the material to substantial parallelism with the outline of the thus rolled blank.

JAMES H. McKEE.